Nov. 14, 1967  A. L. ZAVITZ ET AL  3,352,953
PRESSURE-MOLDING METHOD
Filed May 27, 1965
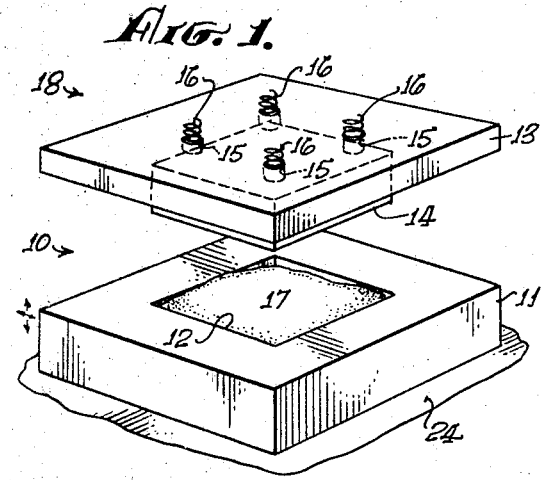
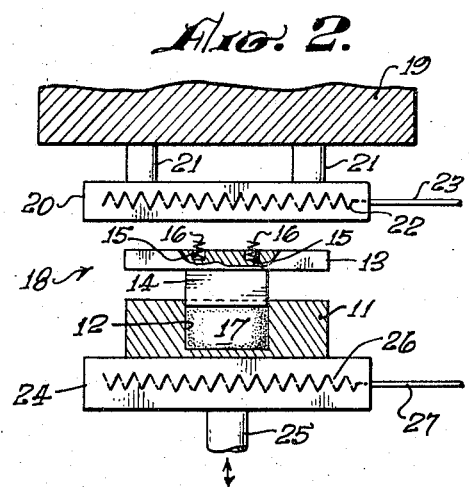
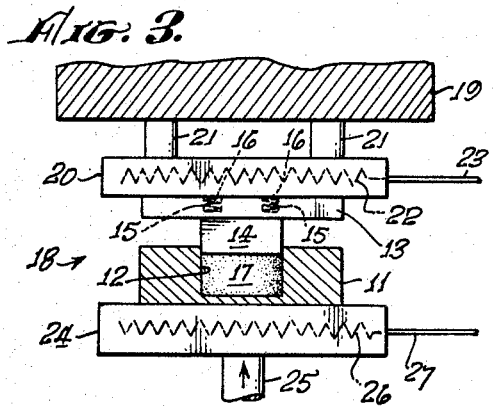
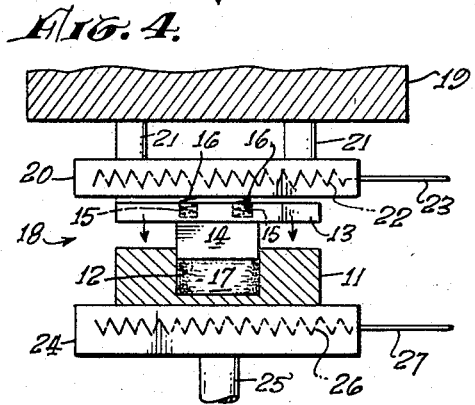
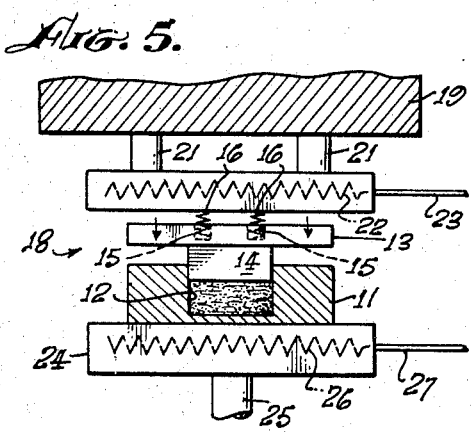
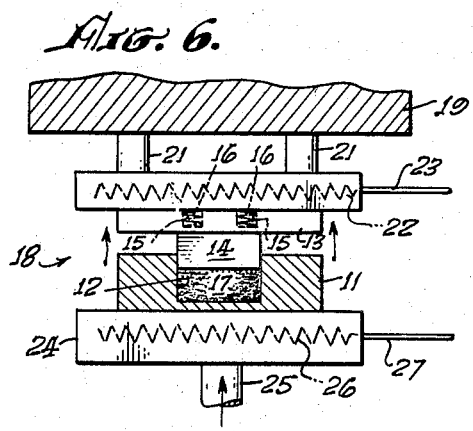
INVENTORS.
ARNOLD L. ZAVITZ,
RAMON D. VANDERVEER,
By
ATTORNEY.

United States Patent Office 3,352,953
Patented Nov. 14, 1967

3,352,953
PRESSURE-MOLDING METHOD
Arnold L. Zavitz, Upland, and Ramon D. Vanderveer, Pomona, Calif., assignors to General Dynamics Corporation, Pomona, Calif., a corporation of Delaware
Filed May 27, 1965, Ser. No. 459,412
8 Claims. (Cl. 264—71)

ABSTRACT OF THE DISCLOSURE

Broadly, the disclosure is directed to a method and apparatus which involves the use of precalibrated compression type springs, the springs being disposed between the movable part of the mold and the pressure applying surface of the apparatus. The force of the apparatus is thus applied to the springs rather than the mold element directly and the springs serve to apply force to the mold element for compacting the material therein upon heating of the material, thus enabling close control over applied mold pressure.

---

This invention relates generally to molding methods for carrying out the methods, and particularly to a method for the encapsulation of components such as electronic components.

Heretofore in the art numerous methods and forms of apparatus have been resorted to for the purpose of encapsulating electronic components. In all of such known apparatus, however, the load or the preformed blank of moldable composition and components to be encapsulated have been placed within a mold and heat and pressure applied thereto until the composition flows and conforms to a desired configuration of the die cavity. These prior known processes are generally known as pure compression molding.

The method and apparatus of this invention differs from the prior known processes in that it utilizes precalibrated compression springs wherein the springs are initially compressed and as the molding compound becomes fluid, due to heat applied thereto, the springs tend to close the mold, thus proving a semi-compression molding technique which may utilize low density molding compounds.

The advantages of the present invention over the prior known molding processes and apparatus are as follows: (1) the pressure applied to the components in the mold cavity can be closely controlled due to the novel spring arrangement and the size of the springs (ft./lbs.); (2) the density of the material being molded can be held very close as the amount is calculated and weighed for the area of the cavity being encapsulated; (3) the mold cavity is filled with the molding compound and evacuated to remove moisture and air from the compound: (4) the mold cavity can be vibrated to allow the molding compound to settle in the cavity around the compound before and during the evacuating operation; and (5) the process eliminates surface blisters and voids.

Therefore, it is an object of this invention to provide a molding method for carrying out the same.

A further object of the invention is to provide a molding method particularly adapted for use of low density molding compounds.

Another object of the invention is to provide a method for the encapsulation of electronic components.

Another object of the invention is to provide a method of the compression type technique for the encapsulation of components utilizing low density molding compounds.

Other objects and advantages of the invention will become apparent from the following detailed description taken in connection with the accompanying drawings, in which:

FIG. 1 is perspective view of an embodiment of the mold die prior to application of heat and pressure to the material contained therein;

FIG. 2 is a view partially in cross-section showing the FIG. 1 die embodiment positioned in the molding equipment; and FIGS. 3–6 are partially cross-sectioned views illustrating various steps for carrying out the molding method.

As pointed out above, the present invention differs from the known compression type molding methods and apparatus which are generally of the pressure adjustment type as illustrated by U.S. Patent 2,440,806 wherein the more compression applied to the spring the greater the applied pressure to the molding compound. In the method and apparatus of this invention, the pressure is calibrated or arrived at during compression of the spring or springs which provides a controlled semi-compression molding method which utilizes a fully compressed spring precalibrated for a desired p.s.i. The unique spring arrangement thus provides an encapsulation technique particularly suited for molding applications utilizing low density molding compounds.

Referring now to FIGS. 1 and 2, an embodiment of the apparatus for carrying out the molding process is illustrated. The mold die indicated generally at 10 (see FIG. 1) comprises a die block or base 11 having a cavity or well 12 therein defining the desired configuration of the molded end product, and a die plunger plate 13 including a plunger 14 adapted to be inserted into the cavity 12 of base or block 11. Plate 13 is provided with a plurality of recesses 15 (four being shown in this embodiment) within each of which is positioned an open-coil, precalibrated, compression type spring 16. Mold 10, having a cavity 12 filled with a predetermined amount of encapsulation or molding compound 17, described hereinafter, is positioned in a molding press shown in FIG. 2 and generally indicated at 18. Molding press 18 comprises a stationary head 19 having an upper platen 20 supported therefrom via members 21. Platen 20 includes an internal heating mechanism such as resistance heater unit 22 connected to a power source and control means (not shown) via electrical leads 23. A lower platen 24 is mounted on a cylinder rod 25 or other suitable actuation device, base 11 of mold die 10 being supported thereby. Platen 24, like upper platen 20, includes an internal heating unit such as resistance heater 26 which is adapted to be connected through leads 27 to the power source and control means therefor (not shown). Cylinder rod 25 may be moved upwardly or downwardly by a suitable system such as a conventional hydraulic arrangement (not shown), whereby mold die 10 may be raised or lowered as desired.

To successfully encapsulate electronic packages, for example, with low density molding compound, by controlled-compound semi-compression molding of this invention, the following procedures should be met:

(1) Calculate the amount of low density molding compound required to fill the cavity being molded.

(2) Determine the molding temperature. This will be the lowest shelf temperature of the components in the electronic package to be encapsulated by the controlled semi-compression molding method.

(3) Determine the pressure of the spring or springs from, for example, a pressure vs. temperature chart, such a chart being described hereinbelow.

The following sequence of steps set forth a manner of encapsulating elements, such as electronic components (not shown), in accordance with the invention by the utilization of the illustrated apparatus and with low density molding compounds.

(1) Position an assembled electronic package (not shown) to be encapsulated into mold cavity 12 of die 10.

(2) Pre-heat mold die 10 to a pre-determined molding temperature.

(3) Pour pre-measured low density molding compound 17 into the cavity 12 of die 10.

(4) Vibrate the mold die 10 to allow molding compound 17 to settle.

(5) Evacuate the mold die 10 to remove air and moisture from the molding compound 17.

(6) Place the springs 16 in recesses 15 of plunger plate 13.

(7) Position the die mold 10 in molding press 18 as illustrated in FIG. 2.

(8) Close press 18 via actuator 25 until springs 16 are completely compressed as shown in FIG. 3. Heat transfer from heating elements 22 and 26 via platens 20 and 24 causes the compound 17 to become fluid whereby the springs 16 force the plunger plate 13 downwardly as illustrated in FIGS. 4 and 5 until the plate 13 closes against base 11 or to a predetermined position with respect to base 11.

(9) The lower platen 24 is then raised by actuator 25 thus raising mold die 10 until the springs 16 are again compressed against upper platen 20 as shown in FIG. 6. Additionally pressure is then applied to platen 24 to provide a mold die clamping pressure.

(10) Shutting off the energy to heating units 22 and 26 and allowing the mold 10 to cool thus curing the encapsulant 17 and producing an encapsulated electronic unit.

If desired, the vibrating and evacuating steps set forth above may be omitted. Also, in certain applications the step of preheating the mold die may be omitted.

The molding temperature varies for various compounds and/or components for each die cavity configuration. For example, with a die cavity for a 2 cubic inch module a time vs. temperature chart may be utilized with the cure time per cycle being set forth on the Y axis and the temperature on the X axis, the time ranging from 1 to 15 min. with the temperature ranging from 170 to 310 degrees. Thus, by way of example, only, a cure time of 5 min. would be required for 250° or a cure time of 15 min. would be required for 180° with a low density glass filled epoxy molding compound.

The pressure of the compression spring can be determined for example, from a pressure vs. temperature chart wherein the spring pressure per square inch is plotted on the Y axis and the temperature on the X axis. It has been shown that with a glass filled epoxy molding compound that a direct relationship exists between the spring pressure and temperature with, for example, the pressure required for encapsulation of packages with more than 5 square inches of area being greater than that required for packages with less than 5 square inches of area. The range of the spring pressure in the above example being from 0 to 60 pounds per square inch while the temperature ranges from 170 to 330 degrees. Thus, for example, with a temperature of 175 degrees, a spring pressure of 56 lbs./sq. in. or with a temperature of 310 degrees 22 lbs./sq. in. is required for packages over 5 sq. in. area while with the same temperatures and under 5 sq. in. area 44 and 16 lbs./sq. in., respectively, are required.

It has thus been shown that the present invention overcomes the disadvantages of prior known compression molding processes and that this invention provides the following principal advantages: (1) the springs, pre-calibrated to the required p.s.i., give accurate control pressure applied to the cavity at extremely low pressures; and (2) low density compounds with, for example, glass micro balloons as filler can be molded without crushing the glass micro balloons.

While specific apparatus has been illustrated along with a specific sequence of steps for carrying out the invention, modifications and changes will become apparent to those skilled in the art, and it is intended to cover in the appended claims, all such changes and modifications as come within the spirit and scope of the invention.

What we claim is:

1. A controlled semi-compression component encapsulating method comprising the steps of: positioning the components to be encapsulated in a die having cooperating cavity and plunger portions, pre-heating the die to a pre-determined temperature, supplying the die with a pre-measured amount of low density molding compound, positioning pre-calibrated spring members on the plunger portion of the die, placing the die in a pressing apparatus, actuating the apparatus to substantially fully compress the spring members to apply pressure to the molding compound by the plunger, applying heat to the die whereby the molding compound becomes fluid and permitting the spring members to extend and move the plunger portion further into the cavity to compact the compound within the die, actuating the apparatus to substantially fully re-compress the spring members to apply further pressure to the compound, and allowing the compound to cure.

2. A method for encapsulating components comprising the steps of: placing components to be encapsulated in a die cavity, supplying the die cavity with a predetermined amount of molding compound, positioning a plunger member over the die cavity, locating pre-calibrated resilient members on the plunger member, placing the thus assembled unit in a press, actuating the press to at least partially compress the resilient members to apply pressure to the compound by the plunger member, applying heat to the molding compound for fluidizing the compound whereby the resilient members expand and force the plunger member further into the die cavity, actuating the press to at least partially recompress the resilient members to apply further pressure to the compound, and allowing the compound to cool and cure.

3. A method of encapsulating components comprising the steps of: positioning a package of assembled components in a cavity of a die, providing the die cavity with a predetermined amount of low density molding compound, positioning a plunger member over the die cavity, vibrating the die to allow the molding compound to settle, evacuating the die cavity to remove air and moisture from the molding compound, locating pre-calibrated springs on the plunger member, placing the thus assembled unit in a press, closing the press to substantially fully compress the springs to apply pressure to the molding compound by the plunger, applying heat to the molding compound which causes same to become a fluid and allows the plunger member to be forced into the die cavity by the expansion of the springs closing the press further to substantially fully recompress the springs and further apply pressure to the molding compound and allowing the compound to cool and cure.

4. The method defined in claim 3, additionally including the step of preheating the die prior to placing the molding compound in the cavity thereof.

5. A controlled semi-compression method for component encapsulation comprising the steps of: placing the components to be encapsulated in a cavity of a die having a male portion adapted to cooperate with the cavity, placing a measured amount of molding compound in the die cavity, positioning pre-calibrated resilient members on the male portion of the die, placing the die in a press, closing the press sufficiently to at least partially compress the resilient members and compact the molding compound by the male portion, applying heat to the molding compound which causes same to become fluid and allowing the resilient members to extend and further compact the compound within the die cavity, further closing the press to at least partially recompress the resilient members and further applying pressure to molding compound, shutting off the heat, and allowing the compound to cure.

6. The method defined in claim 5, additionally including the step of preheating the die.

7. The method defined in claim 5, additionally including the step of vibrating the die after the compound has been placed therein.

8. The method defined in claim 5, additionally including the step of evacuating the die cavity after the compound has been placed therein.

References Cited

UNITED STATES PATENTS

| | | | |
|---|---|---|---|
| 2,569,226 | 9/1951 | Carter | 264—120 |
| 2,874,751 | 2/1959 | Norton | 18—17 |
| 3,213,164 | 10/1965 | Freeman et al. | 264—101 |
| 3,261,378 | 7/1966 | Ayer et al. | 264—71 |

ROBERT F. WHITE, *Primary Examiner*.

J. R. HALL, *Assistant Examiner*.